United States Patent [19]
Lee

[11] Patent Number: 5,810,046
[45] Date of Patent: Sep. 22, 1998

[54] DEVICE AND METHOD FOR SELECTING CONTROL MODE IN POWER CONSTRUCTION VEHICLE

[75] Inventor: Jin Han Lee, Changwon, Rep. of Korea

[73] Assignee: Samsung Heavy Industries Co., Ltd., Rep. of Korea

[21] Appl. No.: 762,977

[22] Filed: Dec. 10, 1996

[30] Foreign Application Priority Data

Apr. 30, 1996 [KR] Rep. of Korea ................... 1996 13965

[51] Int. Cl.$^6$ ...................................................... F15B 13/08
[52] U.S. Cl. ................ 137/596.16; 91/1; 91/54; 91/527; 91/529; 137/269; 137/636.2
[58] Field of Search .................................. 91/1, 54, 527, 91/529; 137/1, 269, 596.16, 636.2

[56] References Cited

U.S. PATENT DOCUMENTS

| | | |
|---|---|---|
| 4,633,666 | 1/1987 | Karakama . |
| 4,712,377 | 12/1987 | Yoshida et al. . |
| 5,077,973 | 1/1992 | Suzuki et al. . |
| 5,235,811 | 8/1993 | Arii et al. . |
| 5,267,440 | 12/1993 | Nakamura et al. . |
| 5,383,390 | 1/1995 | Lukich ................................... 91/459 X |
| 5,497,805 | 3/1996 | Sunamura et al. ..................... 91/527 X |

FOREIGN PATENT DOCUMENTS 61-31532  2/1986  Japan ........................................ 91/527

*Primary Examiner*—Gerald A. Michalsky
*Attorney, Agent, or Firm*—Harness, Dickey & Pierce, P.L.C.

[57] ABSTRACT

A device and method for selecting a control mode in a power construction vehicle is disclosed. The device has a control mode select switch which selects a function for setting new matching relations between the control levers and the proportional control valves. A controller sets the new matching relations and stores the new matching relations, and controls the actuators in accordance with the new matching relations. In the control mode selection method, one operational motion of an actuator is primarily selected and displayed on a display means. Thereafter, a voltage signal indicative of a levering angle of a control lever associated with the selected actuator is output, thus setting a new matching relation between the control lever and an associated proportional control valve. The above process is repeated in order to continuously set and store new matching relations between the control levers and proportional control valves associated with the other actuators.

6 Claims, 1 Drawing Sheet

DEVICE AND METHOD FOR SELECTING CONTROL MODE IN POWER CONSTRUCTION VEHICLE

BACKGROUND OF THE INVENTION

1. Field of the Invention

The present invention relates, in general, to a control mode selection device and method for power construction vehicles such as power excavators and, more particularly, to an improvement in such a device and method for allowing an operator to freely set new matching relations between control levers and associated electronic proportional control valves, thereby easily controlling the actuators in accordance with the new matching relations while meeting various working environments and conditions of the construction vehicles.

2. Description of the Prior Art

As well known to those skilled in the art, a power construction vehicle such as a power excavator is provided with two control levers: left- and right-hand control levers, which are levered by an operator to the left, right, front or back and output voltage signals indicative of levering angles to a controller. Upon receiving the voltage signals from the control levers, the controller outputs current control signals to electronic proportional control valves of swing, boom, arm and bucket actuators associated with the control levers. In response to the current control signals from the controller, the proportional control valves output pilot pressures in order to controllably move the spools of associated directional control valves thereby controllably feeding pressurized fluid output from a hydraulic pump to the actuators. In the above construction vehicle, the matching relations between the control levers and associated proportional control valves may be changed between several modes. An example of a typical device for changing the matching relations between the levers and associated proportional control valves is disclosed in Japanese Patent Publication No. Sho 61-31532 (Application No. Sho 59-154904).

In the above Japanese device, the control levers are electrically connected to associated electronic proportional control valves, with a controller being provided on the lines between the control levers and the proportional control valves. Several matching relations between the control levers and associated proportional control valves are stored in the memory of the controller. In order to change the matching relations between the levers and proportional control valves, an operator inputs a mode select signal through a mode select means thereby changing the existing matching relations into other matching relations which are well known to and easily controlled by the operator.

However, the above device is problematic in that the number of matching relations which can be selected by an operator is limited since the operator only selects the matching relations which are stored in the memory of the controller. Therefore, the operators of power (construction vehicles may fail to select appropriate matching relations which effectively meet the change of working environments and conditions of the vehicles, thereby failing to optimally control the actuators. It is thus necessary to freely set the matching relations between the control levers and associated proportional control valves in order to effectively control the actuators while meeting the change of working environments and conditions of the vehicles.

SUMMARY OF THE INVENTION

It is, therefore, an object of the present invention to provide a control mode selection device and method for power construction vehicles in which the above problems can be overcome and which allows an operator to freely set new matching relations between control levers and associated electronic proportional control valves and to control the actuators in accordance with the new matching relations, thereby easily controlling the actuators while meeting various working environments and conditions of the construction vehicles and being convenient to operators, and improving work efficiency of the construction vehicles.

In an aspect, the present invention provides a device for selecting a control mode in a power construction vehicle, comprising a plurality of control levers selectively levered by an operator to the left, right, front or back, a plurality of potentiometers provided on the control levers and separately operated in conjunction with movement of the control levers prior to outputting voltage signals, and a plurality of electronic proportional control valves controlling a plurality of directional control valves in response to the voltage signals thereby controlling a plurality of actuators, further comprising: a control mode select switch selectively turned on in order to select a function for setting new matching relations between the control levers and the proportional control valves in addition to existing matching relations; a controller adapted for setting the new matching relations in accordance with a predetermined process when the switch is turned on, storing the new matching relations and controlling the actuators in accordance with the new matching relations; and means for displaying both a function of the select switch and a function of the controller during the process for setting the new matching relations, thereby informing the operator of the functions.

In another aspect, the present invention provides a method for selecting a control mode in a power construction vehicle, the vehicle having a plurality of control levers, a plurality of potentiometers adapted for converting the levering angles of the control levers into current amounts of voltage signals, and a controller adapted for controlling a plurality of electronic proportional control valves of actuators in response to the voltage signals from the potentiometers, comprising the steps of: a) selecting one operational motion of an actuator when a control mode select switch is turned on, and displaying the selected operational motion of the actuator on displaying means; b) receiving a voltage signal indicative of a levering angle of a control lever associated with the selected actuator and setting a new matching relation between the control lever and an associated proportional control valve, and storing the new matching relation in a memory; and c) repeating the steps (a) and (b) in order to continuously set and store new matching relations between the control levers and proportional control valves associated with the other actuators.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
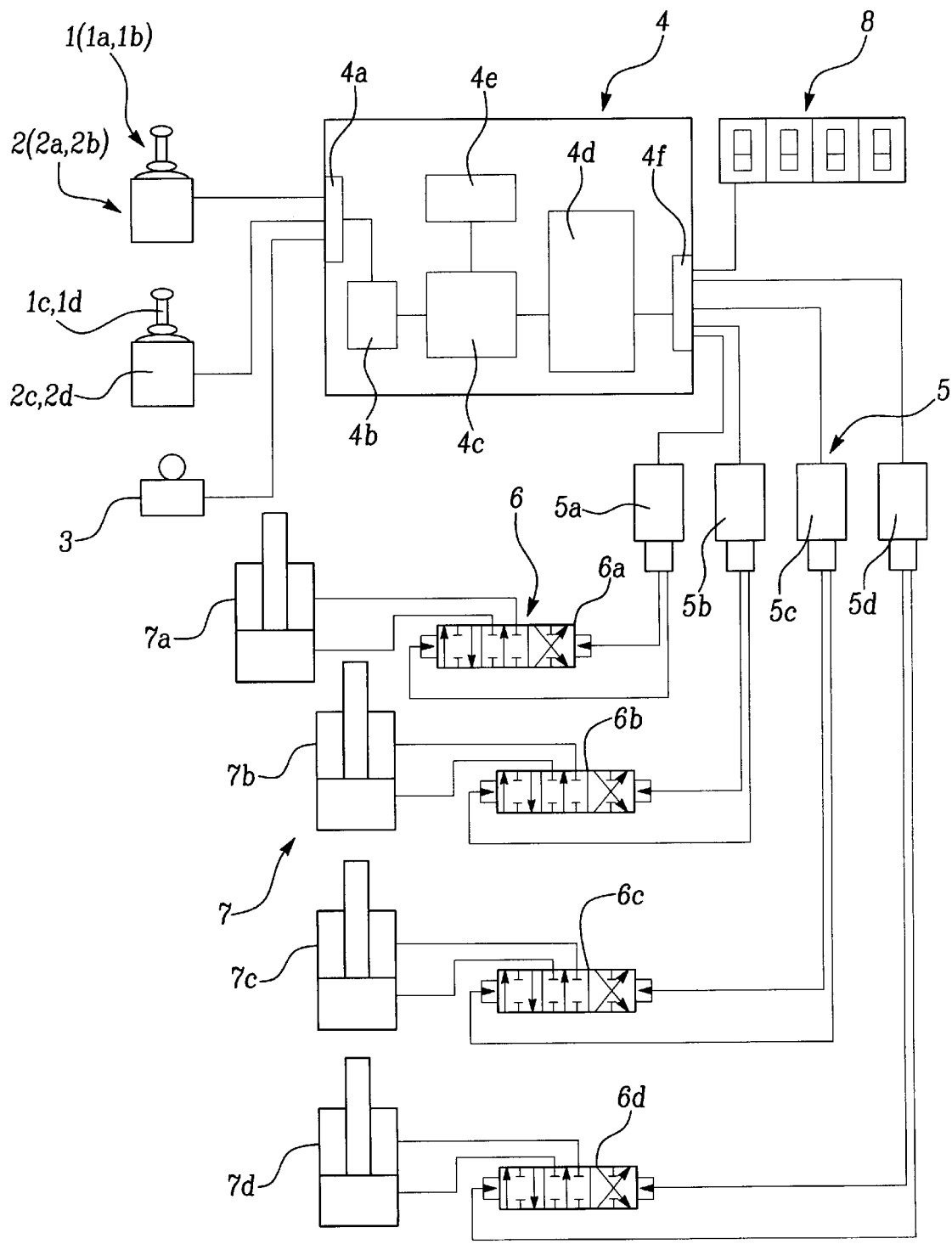
FIG. 1 is a circuit diagram showing the hydraulic circuit of a control mode selection device for power construction vehicles in accordance with the preferred embodiment of the present invention.

FIG. 1 is a circuit diagram showing the hydraulic circuit of a control mode selection device for power construction vehicles in accordance with the preferred embodiment of the present invention.

As shown in FIG. 1, the control mode selection device of the invention includes two control levers: left- and right-hand control levers 1 which are levered by an operator to the left, right, front or back. A potentiometer 2 is provided on each of the control levers 1 and is separately operated in conjunction with the levered directions of an associated control lever 1, thus converting the levering angles of the control lever 1 into voltage signals and outputs the voltage signals to a controller 4. The controller 4 performs a signal operation and outputs current control signals to electronic proportional control valves 5 in order to control the actuators 7 in response to the voltage signals from the potentiometers 2. The proportional control valves 5 output pilot pressures ill proportion to the current control signals from the controller 4. In response to the pilot pressures from the proportional control valves 5, a plurality of directional control valves 6 control the flow rate and flow direction of pressurized fluid output from a main hydraulic pump to the actuators 7. The control mode selection device also includes a mode select switch 3 which is connected to the controller 4. When the mode select switch 3 is turned on, the switch 3 allows an operator to freely set new matching relations between the control levers 1 and the proportional control valves 5, which are operated in proportion to the levering angles of the control levers 1, in addition to existing matching relations between the levers 1 and valves 5. The control mode selection device further includes a display means 8 which displays both the function of a control lever and the existing function of the controller, thereby informing the operator of the above functions. In the present invention, the display means 8 may be selected from LCDs, LEDs and CRT displays.

The controller 4 has an input port 4a, ROM 4b, RAM 4e, CPU 4c, AMP circuit 4d, and output port 4f. The input port 4a receives both the voltage signals from the potentiometers 2 and an on/off signal from the mode select switch 3. The ROM 4b and RAM 4e store and set data of matching relations between the control levers 1 and the proportional control valves 5. The CPU 4c performs a signal operation using both the voltage signals from the control levers 1 and the matching relation data from the ROM 4b and RAM 4e. The AMP circuit 4d outputs current signals in response to output signals of the CPU 4c. The output port 4f outputs the current signals of the AMP circuit 4d to the proportional control valves 5.

The operational effect of the control mode selection device will be described hereinbelow.

When the mode select switch 3 is turned on during an operation of the actuators 7, it is possible to set new matching relations between the control levers 1 and the proportional control valves 5.

That is, when the mode select switch 3 is turned on, the ROM 4b of the controller 4 causes the CPU 4c to select one of several motions of the actuators 7, for example, a boom-up motion, and to display a signal, for example, BM-U, indicative of the selected motion of the actuator on the display 8. The signal "BM-U" displayed on the display 8 informs the operator of the boom actuator 7a in a boom-up motion. When the operator levers a boom control lever 1 in order to achieve a boom-up motion, a voltage signal is applied from the control lever 1 to the RAM 4e of the controller 4. Thereafter, the CPU 4c selects a boom-down motion and displays a signal "BM-D" on the display 8. When the operator levers the boom control lever 1 in order to achieve a boom-down motion, a voltage signal is applied from the control lever 1 to the RAM 4e. Therefore, new matching relations between the boom control lever 1 and the boom proportional control valves 5 are set by and stored in the controller 4 and are used for controlling the boom actuator during an operation. The above process is repeated in order to set and store new matching relations between the control levers 1 and the other proportional control valves associated with the arm actuator 7b, bucket actuator 7c and swing motor 7d. The new matching relations between the control levers 1 and associated proportional control valves 5 are stored in the RAM 4e of the controller 4. In an operation of a construction vehicle, the CPU 4c performs a signal operation in accordance with the new matching relations, thereby controlling the actuators 7 in accordance with the new matching relations during the operation. The control mode selection device and method of this invention thus allows an operator to freely set new matching relations between the control levers 1 and associated electronic proportional control valves 5.

As described above, the present invention provides a device and method for selecting a control mode in a power construction vehicle. The control mode selection device has a control mode select switch which is selectively turned on in order to select a function for setting new matching relations between the control levers and the proportional control valves in addition of existing matching relations. A controller sets the new matching relations in accordance with a predetermined process and stores the new matching relations when the select switch is turned on, and controls the actuators in accordance with the new matching relations. The device also has a means for displaying both a function of the switch and a function of the controller during a process for setting the new matching relations, thereby informing the operator of the functions. In the control mode selection method, one operational motion of an actuator is selected and displayed on a display means when the control mode select switch is turned on. Thereafter, a voltage signal indicative of a levering angle of a control lever associated with the selected actuator is output prior to setting a new matching relation between the control lever and an associated proportional control valve. The new matching relation is stored in a memory of a controller. The above process is repeated in order to continuously set and store new matching relations between the control levers and proportional control valves associated with the other actuators.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for selecting a control mode in a power construction vehicle, comprising a plurality of control levers selectively levered by an operator to the left, right, front or back, a plurality of potentiometers provided on the control levers and separately operated in conjunction with movement of the control levers prior to outputting voltage signals, and a plurality of proportional control valves controlling a plurality of directional control valves in response to the voltage signals thereby controlling a plurality of actuators, further comprising:

a controller operably coupled between the control levers and the proportional control valves, said controller including a memory wherein a plurality of existing matching relations between the control levers and associated proportional control valves are stored;

mode select means operably coupled to said controller for selecting one of said plurality of existing matching relations, said mode select means further selectively changing said selected matching relation with another of said plurality of existing matching relations;

mode set means for selectively setting new matching relations between said control levers and said proportional control valves, wherein said new matching relations are added to said existing matching relations;

said controller storing said new matching relations in said memory, said controller further controlling said actuators in accordance with said new matching relation when said new matching relation is set by said mode set means; and means for displaying both a function of said mode select means and a function of said controller during a process for setting said new matching relation, thereby informing the operator of said functions.

2. A device for selecting a control mode in a power construction vehicle comprising:

a plurality of control levers selectively levered by an operator to the left, right, front, or back;

a plurality of potentiometers coupled to the control levers and separately operated in conjunction with movement of the control levers prior to outputting voltage signals;

a plurality of electronic proportional control valves controlling a plurality of directional control valves in response to the voltage signals thereby controlling a plurality of actuators;

a controller operably coupled between the control levers and the proportional control valves, said controller including a memory wherein a plurality of existing matching relations between the control levers and associated proportional control valves are stored; and mode select means operably coupled to the controller for selecting one of the plurality of existing matching relations, the mode select means further selectively changing the selected matching relation with another of the plurality of existing matching relations; and mode set means for selectively setting new matching relation between the control levers and the proportional control valves, said new matching relations added to the existing matching relations, the controller storing the new matching relation in the memory and controlling the actuators in accordance with the new matching relation when the new matching relation is set by the mode set means.

3. The device of claim 2 further comprising means for displaying both a function of said mode select means and a function of said controller during a process for setting the new matching relations to inform the operator of said functions.

4. The device of claim 3 wherein said means for displaying further comprises one of the group consisting of LCDs, LEDs, and CRT displays.

5. The device of claim 2 wherein said controller further comprises:

an input port for receiving voltage signals from the potentiometers and an on/off signal from the control mode select switch;

a ROM and RAM for storing and setting data of matching relations between the control levers and the proportional control valves;

a CPU for performing signal operations using the voltage signals from the control levers and the matching relation data from the ROM and RAM;

an amp circuit for outputting current signals in response to output signals of the CPU; and an output port for outputting the current signals of the amp circuit to the proportional control valves.

6. The device of claim 2 wherein said plurality of actuators further comprise:

at least one of the group consisting of a boom actuator, an arm actuator, a bucket actuator, and a swing motor actuator.

* * * * *